(12) United States Patent
Thomle et al.

(10) Patent No.: US 8,066,558 B2
(45) Date of Patent: Nov. 29, 2011

(54) DEMAND CONTROL VENTILATION SENSOR FAILURE

(75) Inventors: Adrienne G. Thomle, Plymouth, MN (US); Todd Kreft, Richfield, MN (US)

(73) Assignee: Honeywell International Inc., Morristown, NJ (US)

( * ) Notice: Subject to any disclaimer, the term of this patent is extended or adjusted under 35 U.S.C. 154(b) by 1786 days.

(21) Appl. No.: 10/997,501

(22) Filed: Nov. 24, 2004

(65) Prior Publication Data

US 2006/0107670 A1 May 25, 2006

(51) Int. Cl.
*F24F 7/06* (2006.01)
(52) U.S. Cl. ........................................... 454/256
(58) Field of Classification Search .................. 454/256, 454/257; 237/2 R
See application file for complete search history.

(56) References Cited

U.S. PATENT DOCUMENTS

| | | | |
|---|---|---|---|
| 3,434,407 A * | 3/1969 | Best ................................. | 454/72 |
| 4,086,781 A | 5/1978 | Brody et al. | |
| 4,205,381 A | 5/1980 | Games et al. | |
| 4,288,990 A | 9/1981 | Schulz | |
| 4,294,404 A | 10/1981 | Gajjar | |
| 4,383,477 A | 5/1983 | Nilsson et al. | |
| 4,407,185 A | 10/1983 | Haines et al. | |
| 4,407,447 A | 10/1983 | Sayegh | |
| 4,437,608 A | 3/1984 | Smith | |
| 4,886,110 A | 12/1989 | Jackson | |
| 5,119,987 A | 6/1992 | Kobayashi et al. | |
| 5,267,897 A * | 12/1993 | Drees ............................. | 454/225 |
| 5,276,630 A | 1/1994 | Baldwin et al. | |
| 5,292,280 A * | 3/1994 | Janu et al. ..................... | 454/229 |
| 5,312,297 A * | 5/1994 | Dieckert et al. ............... | 454/238 |
| 5,318,224 A * | 6/1994 | Darby et al. .................... | 236/47 |
| 5,394,934 A | 3/1995 | Rein et al. | |
| 5,640,143 A * | 6/1997 | Myron et al. .................. | 340/541 |
| 5,765,636 A | 6/1998 | Meyer et al. | |
| 5,791,983 A | 8/1998 | Robertson | |
| 5,803,804 A | 9/1998 | Meier et al. | |
| 6,019,677 A | 2/2000 | Demster | |
| 6,161,764 A | 12/2000 | Jatnicks | |
| 6,298,912 B1 | 10/2001 | Rayburn et al. | |
| 6,369,716 B1 | 4/2002 | Abbas et al. | |
| 6,428,608 B1 | 8/2002 | Shah et al. | |
| 6,467,695 B1 | 10/2002 | Riley et al. | |

(Continued)

FOREIGN PATENT DOCUMENTS

EP          1333233          6/2003

OTHER PUBLICATIONS

Ashrae Standard 62, "Ventilation for Acceptable Indoor Air Quality Analysis and Recommendations," EBRON, Inc., 12 pages, printed Sep. 27, 2004. http://www.automatedbuildings.com.

(Continued)

*Primary Examiner* — Steven B McAllister
*Assistant Examiner* — Samantha A Miller
(74) *Attorney, Agent, or Firm* — Seager, Tufte & Wickhem LLC

(57) ABSTRACT

Demand ventilation protocols can address the issue of sensor failure while still providing desirable levels of energy conservation. An occupancy indicator such as a sensor can be monitored. If the sensor reading is determined to be incorrect, unexpected or otherwise erroneous, the ventilation system can provide an amount of fresh air sufficient for adequate ventilation without over-ventilating the building.

36 Claims, 5 Drawing Sheets

U.S. PATENT DOCUMENTS

| | | | |
|---|---|---|---|
| 6,514,138 | B2 | 2/2003 | Estepp |
| 6,547,433 | B2* | 4/2003 | Yazici et al. ............ 366/336 |
| 6,578,770 | B1 | 6/2003 | Rosen |
| 6,619,589 | B2* | 9/2003 | Brasseur et al. .......... 244/118.5 |
| 6,623,550 | B2 | 9/2003 | Shah et al. |
| 6,629,886 | B1* | 10/2003 | Estepp ..................... 454/229 |
| 2002/0197949 | A1* | 12/2002 | Kampf et al. ............. 454/75 |
| 2003/0078677 | A1 | 4/2003 | Hull et al. |
| 2003/0199244 | A1 | 10/2003 | Siddaramanna et al. |
| 2005/0095978 | A1* | 5/2005 | Blunn et al. .............. 454/229 |

OTHER PUBLICATIONS

Ashrae Standard, "Ventilation and Acceptable Indoor Air Quality in Low-Rise Residential Buildings," Fourth Public Review, 34 pages, Nov. 2002.

Ashrae Standard 62-2001, "Indoor Air Quality," 39 pages, Feb. 2002.

Carrier, "Carrier Provides the First Affordable, "Real Time" Control System with Comfort Id," 3 pages, Jul. 19, 2000.

Trane Product Catalog, VAV-PRC008-EN, 7 pages.

Trane, "The Threefold Challenge of Ventilating Single-Duct VAV Systems," Trane Engineers Newsletter, vol. 27, No. 1, 1998.

"Indoor Air Quality, A Guide to Understanding ASHRAE Standard 62-2001," TRANE, ISS-APG001-EN, 39 pages, Feb. 2002.

"Ventilation and Acceptable Indoor Air Quality in Low-Rise Residential Buildings," BSR/ASHRAE Standard 62.2P, 35 pages, Nov. 2002.

"Ventilation for Acceptable Indoor Air Quality," ANSI/ASHRAE Standard 62-2001, 187 pages.

"Ventilation for Acceptable Indoor Air Quality," ASHRAE Standard 62-1999, 141 pages.

Carrier, "ComfortIDSystem," Carrier Corporation, Brochure No. 811-017, 8 pages, 1999.

Carrier, "Single Duct Air Terminal Zone Controller, Product Specification, Part No. 33ZCVAVTRM," Carrier Corporation, 4 pages, 1999.

Carrier, "VAV Fan Terminal Zone Controller, Product Specification, Part No. 33ZCFANTRM," Carrier Corporation, 4 pages, 1999.

Di Giacomo et al., "DCV: History, Theory, Myths," Originally Printed in Engineering Systems, 4 pages, Feb. 1999.

http://www.automatedbuildings.com/news/jan03/articles/ebtron/ebt.htm, "ASHRAE Standard 62 Ventilation for Acceptable Indoor Air Quality Analysis and Recommendations," EBTRON, Inc., 12 pages, printed Sep. 27, 2004.

http://www.commercial.carrier.com/commercial/hvac/general/0,,CLI1_DIV12ET14470_ . . . , "What is Demand Control, the Right Amount of Ventilation, at the Right Time and Place for 20% Less," Carrier Corporation, prior to Nov. 3, 2003.

http://www.trane.com/Commercial/library/vol242/v24b.asp, "Designing an ASHRAE 62-Compliant Ventilation System," Engineers Newsletter, vol. 24, No. 2, 11 pages, 1995.

http://www.trane.com/Commercial/library/vol31_3/, "Using CO2 for Demand-Controlled Ventilation," Trane Engineers Newsletter, vol. 31, No. 3, 7 pages, 2002.

Lauria, "Getting More for Less, How Demand Controlled Ventilation Increases Air Quality and Reduces Costs," Carrier Corporation, 6 pages, Dec. 1998.

Schell et al., "Application of CO2-Based Demand Controlled Ventilation Using ASHRAE Standard 62: Optimizing Energy Use and Ventilation," TelAire, TO-98-21-1, 10 pages, prior to Nov. 3, 2003.

Schell et al., "Assessing CO2 Control in Retrofits," ASHRAE Journal, pp. 34-41, Nov. 2002.

Schell, "Proven Energy Savings with DCV Retrofits Using CO2 Levels to Vary Fresh Air Rate Saves Energy and Assures Good IAQ," HPAC Engineering, pp. 41-47, Feb. 2001.

Trane, "Installation/Operator Programming, UCM 4.0 and Wireless VAV Communication, VAV-SVX01B-EN," 43 pages, May 2001.

* cited by examiner

DEMAND CONTROL VENTILATION SENSOR FAILURE

TECHNICAL FIELD

The invention relates generally to ventilation and more particularly to demand control ventilation. More specifically, the invention pertains to sensor failure within demand control ventilation.

BACKGROUND

Many buildings are designed to be as airtight as possible in order to save energy that would otherwise be expended on heating and cooling. It has been discovered, however, that such buildings can suffer from an excessive build up of indoor air contaminants from a variety of sources. A possible solution to indoor air quality issues is to ventilate.

A number of studies have indicated that buildings should be ventilated with specific amounts of outside air to counter this potential build up of indoor air contaminants. Consequently, the American Society of Heating Refrigeration and Air Conditioning Engineers (ASHRAE) has established indoor air standards that have been adopted by many building codes and design engineers. In particular, ASHRAE standards dictate that buildings should be ventilated with differing amounts of outside air based on a number of factors such as potential pollutant levels and occupancy levels.

A number of strategies have previously been provided in answering the need for ventilation. One solution is a fixed air strategy in which a building's HVAC system permits a fixed amount of outside air to enter the building at all times through either passive or active ventilation. While this solution can provide ample fresh air, energy may be wasted heating or cooling fresh air during times when the building is unoccupied or only lightly occupied.

Another strategy is to base ventilation rates on estimated, or projected, occupancy. In particular, unnecessary ventilation may be reduced by estimating or guessing times when a building or a portion of a building such as a room will be less heavily occupied and therefore providing a reduced level of ventilation at such times. This strategy may require manual adjustments of ventilation levels in response to varying occupancy estimates and furthermore may result in incorrect levels of ventilation when occupancy estimates are in error.

Many HVAC systems now include energy recovery ventilators, or air-to-air heat exchangers, in order to capture some of the thermal energy that would otherwise be lost due to exchange of stale indoor air for fresh outdoor air. For example, during a cooling system, the exiting stale (but still cool) air is used to remove at least some heat from the incoming fresh (but relatively warmer) air. During a heating season, the exiting (but still warm) air is used to add at least some thermal energy to the incoming fresh (but relatively colder) air. In some instances, these energy recovery ventilators operate constantly and therefore add load to the HVAC system by over ventilating when ventilation needs are reduced.

A useful strategy is known as demand ventilation, in which the amount of fresh air provided to a building or a portion of a building is varied to accommodate actual demand. While this strategy can address many of the shortcomings of other ventilation schemes such as those discussed above, the strategy inherently relies upon some reliable indication of building occupancy levels.

In some cases, building occupancy levels can be indicated by a variety of different sensors. Unfortunately, sensors can fail. In some systems, a failed sensor or a reading that indicates a failed sensor causes the ventilation system to default to a full ventilation mode in which the ventilation damper or dampers revert to a fully open position.

While this strategy ensures at least adequate ventilation, this can result in excessive ventilation, thereby wasting energy that has been used to heat or cool the air within the building. A need remains, therefore, for demand ventilation protocols that address the issue of sensor failure while still providing for desirable levels of energy conservation.

SUMMARY

The invention provides methods of ventilating an environment utilizing demand control ventilation. In particular, the invention provides methods of recognizing and adapting to sensor failure within demand control ventilation systems.

Accordingly, an illustrative embodiment of the present invention pertains to a method of controlling ventilation of an environment. An occupancy indicator that indicates an occupancy level of the environment is monitored. A set amount of fresh air may be provided to the environment if the occupancy indicator is erroneous or otherwise in error.

In some instances, providing a set amount of fresh air to the environment may involve providing an amount of fresh air that is less than a maximum amount of fresh air that could be provided. In some cases, the occupancy indicator may be deemed to be erroneous if it returns an unexpected value, or if the occupancy indicator indicates a sensor failure. In some embodiments, the occupancy indicator can include a sensor reading that is at least substantially proportional to environment occupancy, or the total number of people present in a particular space.

Another illustrative embodiment of the present invention pertains to a method of controlling the ventilation of an environment. An indication of occupancy of the environment is monitored. In some instances, monitoring an indication of occupancy can include monitoring a carbon dioxide sensor. In other cases, a motion sensor may be monitored.

A relative amount of fresh air that is provided to the environment may be modified in response to the indication of occupancy. In some cases, modifying the relative amount of fresh air that is provided to the environment can include at least partially opening or at least partially closing a damper. In other cases, a damper cycle rate can be increased or decreased.

If the indication of occupancy is determined to be in error or is otherwise erroneous, a set amount of fresh air can be provided to the environment. In some embodiments, providing a set amount of fresh air to the environment may include partially opening the damper to a position that is determined as a function of maximum environment occupancy, or perhaps as a function of occupancy history. In some instances, the set amount of fresh air that is provided to the environment can represent an amount of fresh air that is less than a maximum amount of fresh air.

In some instances, the indication of occupancy can be a voltage that is proportional to an occupancy level. In some cases, an excessively low or minimum voltage can be interpreted as an erroneous indication of occupancy. In some cases, an excessively high or maximum voltage can be interpreted as an erroneous indication of occupancy.

Another illustrative embodiment of the present invention pertains to a method of adjusting a damper that is configured to ventilate an environment. A carbon dioxide detector can be monitored. The damper may be adjusted to a set position upon sensing an erroneous reading from the carbon dioxide detector. In some instances, the set position can be a damper position that is less than fully opened.

Yet another illustrative embodiment of the present invention pertains to a controller that is configured to control ventilation of an environment. The controller may be adapted to monitor an indication of occupancy and to subsequently modify a relative amount of fresh air provided to the environment in response to the indication of occupancy. In some embodiments, the controller may be adapted to monitor an indication of occupancy that can be a voltage that is proportional to occupancy. In some instances, the controller is configured to monitor an indication of occupancy that can include a carbon dioxide sensor and/or a motion sensor. The controller may be configured to modify the relative amount of fresh air provided to the environment by at least partially opening or at least partially closing a damper.

In some instances, the controller may be adapted to provide a set amount of fresh air to the environment if the indication of occupancy is erroneous. The controller may be adapted to determine the set amount of fresh air as a function of maximum environment occupancy. In some instances, the set amount of fresh air can represent an amount of fresh air that is less than a maximum amount of fresh air.

The above summary of the present invention is not intended to describe each disclosed embodiment or every implementation of the present invention. The Figures, Detailed Description and Examples which follow more particularly exemplify these embodiments.

BRIEF DESCRIPTION OF THE FIGURES

The invention may be more completely understood in consideration of the following detailed description of various embodiments of the invention in connection with the accompanying drawings, in which.

Figure 1:
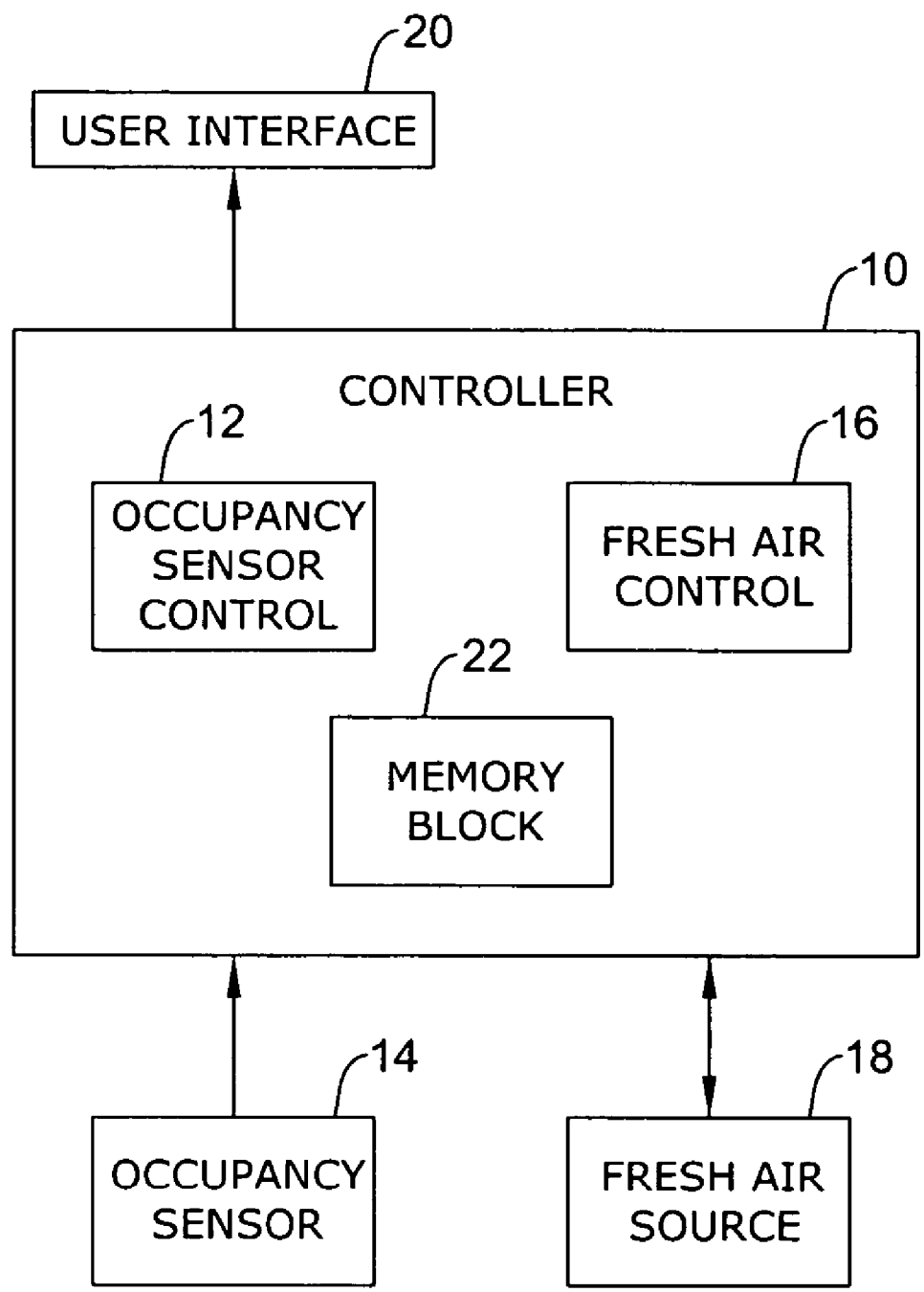
FIG. 1 is a controller in accordance with an embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The invention pertains generally to ventilation systems such as demand control ventilation systems. FIG. 1 in particular illustrates a controller 10 that may be adapted to control at least particular aspects of a demand control ventilation system. Controller 10 can include an occupancy sensor control 12 having software and/or hardware that is adapted to receive an occupancy signal from an occupancy sensor 14. The occupancy signal may be provided to the controller 10 via one or more wires, a network such as ModBus, LON or some other network protocol, an optical and/or wireless link, or in any other suitable manner. In some embodiments, more than one occupancy sensor may be provided, particularly if the environment to be monitored is large.

Occupancy sensor 14 can be or can include any suitable sensor that can provide a signal that is proportional to or otherwise indicative of an occupancy level. In some embodiments, occupancy sensor 14 can include a carbon dioxide sensor, as the amount of carbon dioxide present in an indoor environment can be proportional to the number of carbon dioxide-exhaling humans present within the environment. In other embodiments, occupancy sensor 14 can include a motion sensor.

Controller 10 also includes a fresh air control 16 that includes software and/or hardware that is adapted to send and receive signals from a fresh air source 18. In some embodiments, fresh air source 18 can include a ventilation system, a demand control ventilation system or one or more dampers within a ventilation system. In particular embodiments, fresh air source 18 may include one or more dampers that are moveable between a fully closed position, a fully open position and one or more intermediate positions therebetween.

Fresh air control 16 can send signals to fresh air source 18 such as instructions pertaining to damper opening and closing. For example, fresh air control 16 can instruct fresh air source 18 to fully open one or more dampers, to fully close one or more dampers, or to move one or more dampers to an intermediate position that is either less open or more open than the position the one or more dampers were in prior to receiving such instructions. In some cases, fresh air control 16 can receive signals such as confirmation signals from fresh air source 18.

A user interface 20 can be in communication with controller 10 and may be used to provide any necessary informational messages. Examples of suitable messages include error messages, as will be discussed in greater detail hereinafter.

Controller 10 may also include a memory block 22 that includes software and/or hardware that contains the programming necessary to operate controller 10. This programming may include, for example, information on how to translate occupancy levels into corresponding ventilation requirements.

ASHRAE standard 62-2001, for example, provides a number of suggested ventilation levels based on occupancy and room usage. For example, office space is generalized as having a maximum occupancy of 7 people per one thousand square feet, and needing a minimum of 20 cubic feet per minute (CFM) of fresh air per person. Reception areas, however are estimated as having a maximum occupancy of 60 people per one thousand square feet, and requiring a minimum of 15 CFM of fresh air per person. Differing requirements are provided for a variety of different space usages.

Figure 2:
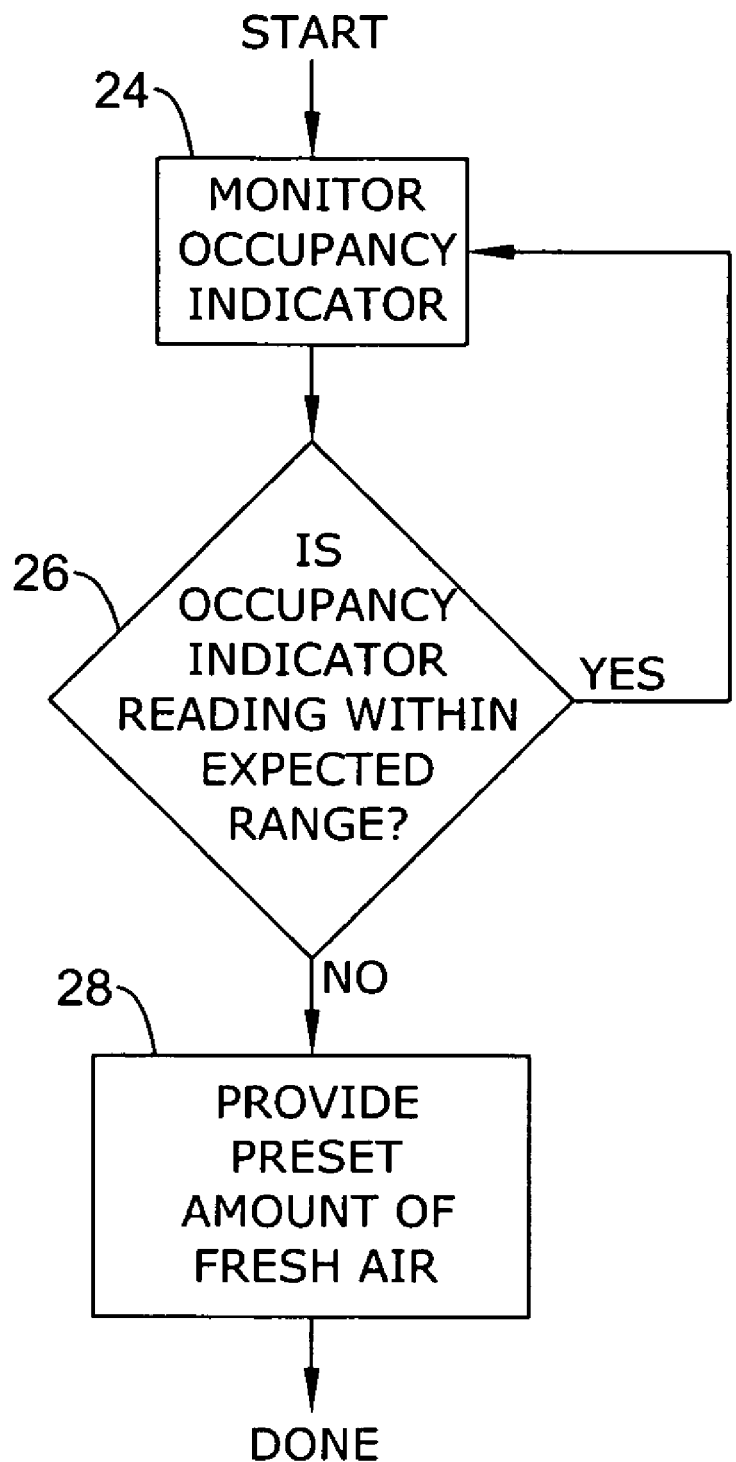
FIG. 2 is a flow diagram showing an illustrative method that may be implemented by the controller of FIG. 1.

Turning now to FIG. 2, there is illustrated a method that can be carried out by controller 10 (FIG. 1). At block 24, occupancy sensor control 12 (FIG. 1) monitors occupancy sensor 14 (FIG. 1). At decision block 26, controller 10 determines if the reading provided by occupancy sensor 14 is within an expected range. The expected range may be static, or it may vary depending on time and/or day of week.

To illustrate, memory block 22 (FIG. 1) can be programmed with or may learn that an office space, for example, tends to contain a larger number of people between 9 am and 5 pm Monday through Friday and a lesser number or even no people during evenings and or weekends. In this scenario, a reading at 11 am Tuesday, for example, indicating that no people are present may be interpreted as unexpected and thus may indicate a sensor failure. Conversely, a reading at 11 pm Tuesday indicating that the office is full of people may similarly be interpreted as an error.

In some embodiments, occupancy sensor 14 (FIG. 1) may return a signal that corresponds to a numerical value. Controller 10 (FIG. 1) can be programmed with or can learn typical ranges for this numerical value. If occupancy sensor 14 returns a numerical value that is outside this range, the occupancy indicator can be interpreted to be incorrect, invalid, out of range or otherwise erroneous. In some cases, occupancy sensor 14 can return a voltage, current and/or frequency that is at least partially proportional to occupancy level. In such cases, controller 10 may be programmed with or can learn an expected range for this voltage, current and/or frequency. If occupancy sensor 14 returns a voltage, current and/or frequency that is outside of this expected range, the occupancy indicator can be interpreted as erroneous.

Returning to FIG. 2, if at decision block 26 controller 10 (FIG. 1) determines that the occupancy reading is within an expected range, control reverts back to block 24 where occupancy sensor control 12 (FIG. 1) continues to monitor occupancy sensor 14 (FIG. 1). However, if the occupancy reading is not within an expected range, control passes to block 28. At block 28, controller 10 calculates a set amount of fresh air that should be provided by fresh air source 18 (FIG. 1). Fresh air control 16 (FIG. 1) then provides the appropriate instructions to fresh air source 18 as to how far to open the one or more dampers present within fresh air source 18. In some instances, a set amount of fresh air can be provided by changing a cycle rate of the one or more dampers included in fresh air source 18.

The set amount of fresh air can be calculated by, for example, using the ASHRAE minimum ventilation standards in combination with information pertaining to maximum building occupancy. In some instances, this can provide a set ventilation level that is sufficient yet represents an amount of fresh air that is less than could be provided if fresh air source 18 (FIG. 1) were fully opened. In some cases, historical occupancy levels can be used to determine the set ventilation level. In some embodiments, the set amount of fresh air may be calculated using the ASHRAE minimum ventilation standards in combination with occupancy levels immediately before occupancy sensor 14 is determined to be providing an unexpected, erroneous or otherwise incorrect signal.

Figure 3:
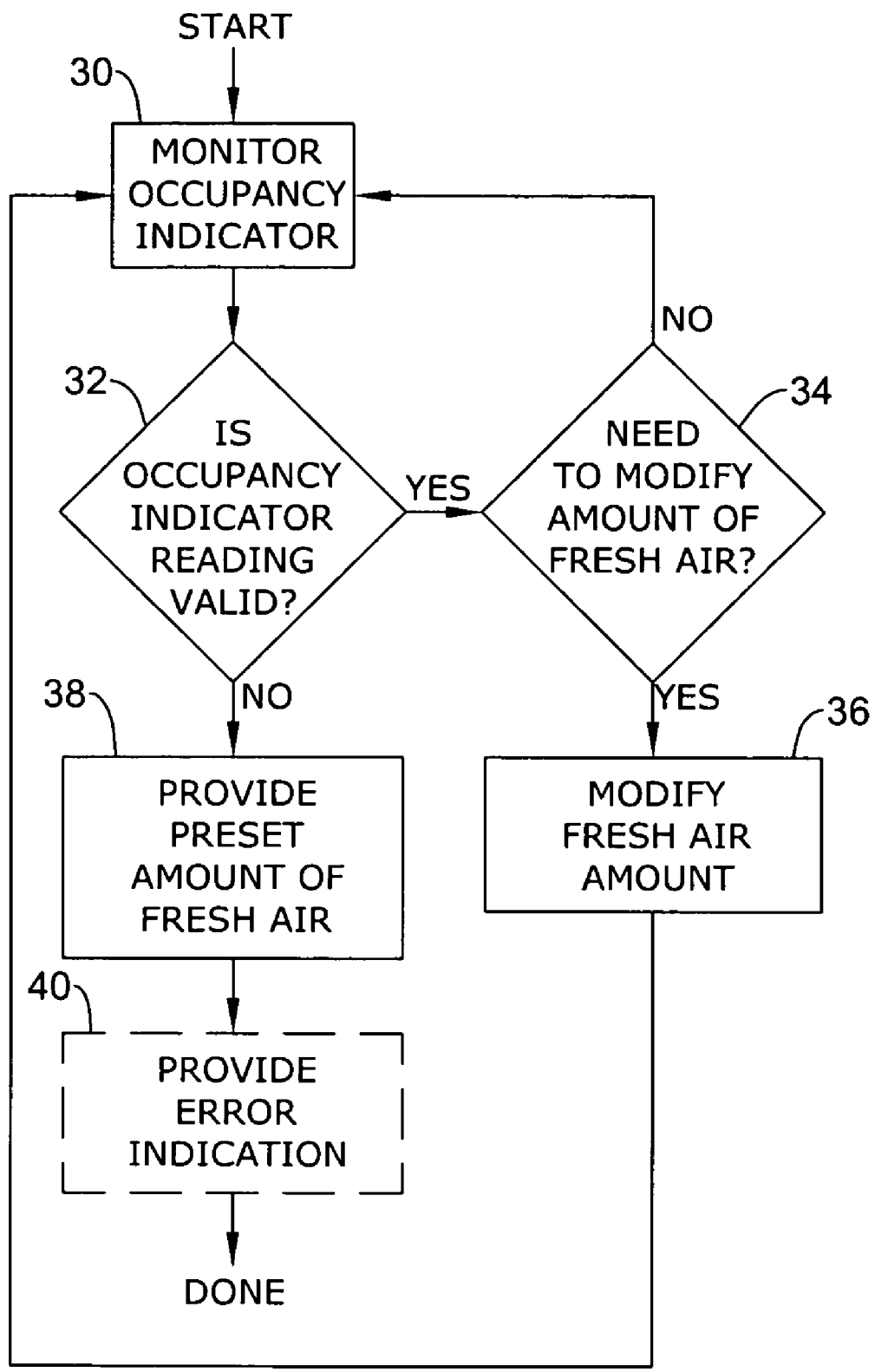
FIG. 3 is a flow diagram showing an illustrative method that may be implemented by the controller of FIG. 1.

FIG. 3 shows another illustrative method that may be carried out by controller 10 (FIG. 1). At block 30, occupancy sensor control 12 (FIG. 1) monitors occupancy sensor 14 (FIG. 1). At decision block 32, controller 10 determines if the reading provided by occupancy sensor 14 is valid, or is within an expected range as was discussed with respect to FIG. 2. If the reading provided by occupancy sensor 14 is determined to be valid, control passes to decision block 34, where fresh air control 16 (FIG. 1) determines if a ventilation change is necessitated by the valid reading provided by occupancy sensor 14.

If a change is required, control passes to block 36, at which point fresh air control 16 (FIG. 1) instructs fresh air source 18 (FIG. 1) to provide a different level of ventilation by, for example, either further opening or further closing one or more dampers. Control then returns to block 30 and occupancy sensor 14 (FIG. 1) is monitored.

However, if at block 32 the reading provided by occupancy sensor 14 (FIG. 1) is deemed to not be valid, i.e. is unexpected, out of range or otherwise apparently incorrect, control passes to block 38. At block 38, controller 10 (FIG. 1) determines what the set amount of fresh air should be, based on, for example, ASHRAE ventilation standards, and either the building's maximum occupancy, occupancy immediately before sensor failure, or some other indication of present occupancy.

Control may pass to optional block 40, where controller 10 (FIG. 1) may provide an error message through user interface 20 (FIG. 1) in order to communicate that occupancy sensor 14 (FIG. 1) may have failed. Any suitable error message may be provided, including relatively more technical messages pertaining to sensor failure or less technical messages such as instructing someone to arrange for a service call.

Figure 4:
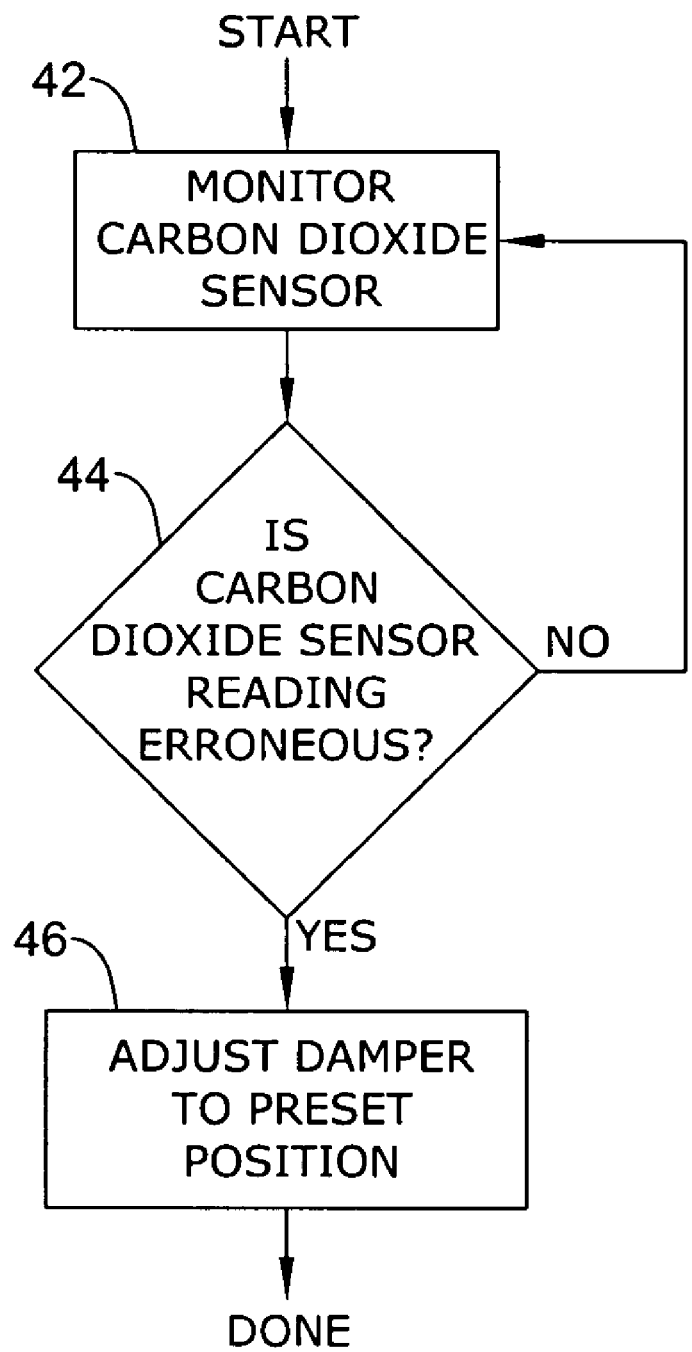
FIG. 4 is a flow diagram showing an illustrative method that may be implemented by the controller of FIG. 1.

FIG. 4 shows another illustrative method that may be carried out by controller 10 (FIG. 1). At block 42, occupancy sensor control 12 (FIG. 1) monitors occupancy sensor 14 (FIG. 1), which in this case is a carbon dioxide sensor. The carbon dioxide sensor measures carbon dioxide content of the air within the building and, in the illustrative embodiment, returns a voltage, current and/or frequency that is at least somewhat proportional to the carbon dioxide concentration. Because humans exhale predictable amounts of carbon dioxide, carbon dioxide concentration can be used as a reasonable indication of the number of people present in an environment as well as an indication of how well the environment within the building is being ventilated.

At decision block 44, controller 10 determines if the reading from the carbon dioxide sensor (occupancy sensor 14 of FIG. 1) is erroneous. As discussed previously with respect to the earlier Figures, a reading may be deemed to be erroneous if it is out of range, unexpected or otherwise apparently in error. For example, and in some embodiments, a carbon dioxide sensor may return a voltage that is between 0 and 10 volts, depending on concentration.

A minimum reading, say of zero volts, may be deemed to be in error as such a reading would presumably indicate a carbon dioxide concentration that is below that of ambient outside air. Conversely, a maximum reading, say of ten volts, may be deemed to be in error as such a reading would presumably indicate a carbon dioxide concentration that is substantially higher than might be obtainable if fresh air source 18 (FIG. 1) is operable. If the carbon dioxide sensor produces some other type of output signal, such as a current or frequency, similar thresholds may be determined and used, as desired.

If the sensor reading is determined to be valid, control reverts to block 42 where occupancy sensor control 12 (FIG. 1) continues to monitor the carbon dioxide sensor (occupancy sensor 14 of FIG. 1). However, if the sensor reading is not valid, control passes to block 46, where fresh air control 16 (FIG. 1) instructs fresh air source 18 (FIG. 1) to adjust one or more dampers to a set position. The set position is a function of what a set amount of fresh air should be. This is determined as discussed with respect to the previous Figures.

Figure 5:
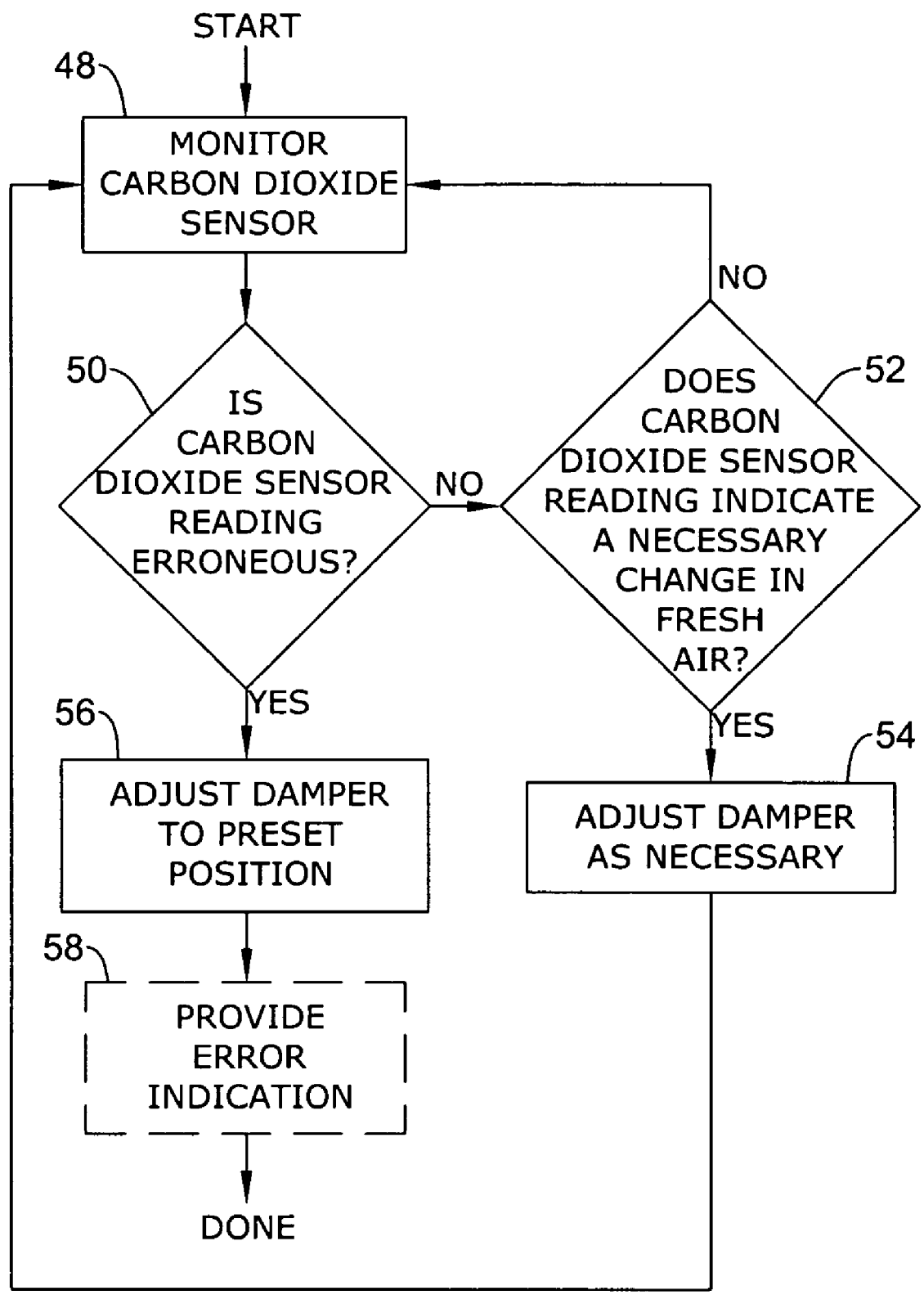
FIG. 5 is a flow diagram showing an illustrative method that may be implemented by the controller of FIG. 1.

FIG. 5 shows another illustrative method that may be carried out by controller 10 (FIG. 1). At block 48, occupancy sensor control 12 (FIG. 1) monitors occupancy sensor 14 (FIG. 1), which in this case is a carbon dioxide sensor as discussed with respect to FIG. 4. Control passes to decision block 50, where controller 10 determines if the sensor reading is erroneous. This may be determined as discussed with respect to FIG. 4.

If the sensor reading is valid, control passes to decision block 52. At decision block 52, controller 10 determines if the sensor reading necessitates a change in the amount of fresh air that is being provided to the environment within the building. If no ventilation change is required, control reverts back to block 48, where occupancy sensor control 12 (FIG. 1) continues to monitor the carbon dioxide sensor (occupancy sensor 14 in FIG. 1).

If a ventilation change is required, control passes to block 54, at which point fresh air control 16 instructs fresh air source 18 (FIG. 1) to provide a different level of ventilation by, for example, either further opening or further closing one or more dampers. Control then returns to block 48 and the carbon dioxide sensor (occupancy sensor 14 in FIG. 1) is monitored.

Returning now to decision block 50, if the carbon dioxide sensor reading is determined to be erroneous, control passes to block 56, where fresh air control 16 (FIG. 1) instructs fresh air source 18 (FIG. 1) to adjust one or more dampers to a set position. The set position is a function of what a set amount of fresh air should be. This is determined as discussed with respect to the previous Figures.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

We claim:

1. A method of controlling ventilation of an environment, the method comprising the steps of:
   monitoring an output of an occupancy indicator of the environment;
   providing a first amount of fresh air to the environment if the occupancy indicator is deemed to be providing an output that is valid, wherein the first amount of fresh air is dependent, at least in part, on the valid output of the occupancy indicator;
   if the occupancy indicator is deemed to be providing an output that is erroneous, always providing a fixed second amount of fresh air to the environment that is based, at least in part, on a programmed room usage setting; and
   if the occupancy indicator is deemed to be providing an output that is erroneous, displaying a message on a user interface indicating that the occupancy indicator is deemed to be providing an output that is erroneous.

2. The method of claim 1, wherein providing the second amount of fresh air to the environment comprises providing an amount of fresh air adequate to ventilate the environment without substantially over-ventilating the environment.

3. The method of claim 1, wherein providing the second amount of fresh air to the environment comprises providing an amount of fresh air adequate to ventilate the environment without substantially wasting thermal energy by exchanging too much treated indoor air with untreated outside air.

4. The method of claim 1, wherein providing the second amount of fresh air to the environment comprises providing an amount of fresh air that is less than a maximum amount of fresh air that can be provided.

5. The method of claim 1, further comprising learning a valid range of the output of the occupancy indicator by monitoring the output of the occupancy indicator over time.

6. The method of claim 1, wherein the occupancy indicator is deemed to be providing an erroneous output if the output of the occupancy indicator indicates a sensor failure.

7. The method of claim 1, wherein the valid output of the occupancy indicator provides a sensor reading that is at least substantially proportional to environment occupancy.

8. A method of controlling ventilation of an environment, the method comprising the steps of:
   monitoring an indication of occupancy of the environment and storing one or more historical occupancy levels;
   modifying a relative amount of fresh air provided to the environment in response to the indication of occupancy; and
   providing an amount of fresh air to the environment if the indication of occupancy is deemed to be erroneous, wherein the amount of fresh air is dependent on the one or more historical occupancy levels.

9. The method of claim 8, wherein monitoring an indication of occupancy comprises monitoring an output of a carbon dioxide sensor.

10. The method of claim 8, wherein monitoring an indication of occupancy comprises monitoring an output of a motion sensor.

11. The method of claim 8, wherein modifying a relative amount of fresh air provided to the environment comprises at least partially opening or at least partially closing a damper.

12. The method of claim 10, wherein modifying a relative amount of fresh air provided to the environment comprises increasing or decreasing a damper cycle rate.

13. The method of claim 8, wherein providing the amount of fresh air to the environment is dependent, at least in part, on an estimated current ventilation need.

14. The method of claim 11, wherein providing the amount of fresh air to the environment comprises partially opening the damper to a position that is dependent, at least in part, on a maximum environment occupancy of the environment.

15. The method of claim 8, wherein providing the amount of fresh air to the environment comprises providing an amount of fresh air that is less than a maximum amount of fresh air that can be provided.

16. The method of claim 8, wherein the indication of occupancy comprises a signal from an occupancy sensor, wherein the signal is related to an occupancy level within the environment when the indication of occupancy is deemed not to be erroneous.

17. The method of claim 16, wherein a signal that is at or below a low end of a valid range is deemed to provide an erroneous indication of occupancy.

18. The method of claim 16, wherein a signal that is at or above a high end of a valid range is deemed to provide an erroneous indication of occupancy.

19. A method of adjusting a damper configured to ventilate an environment, the method comprising the steps of:
   monitoring a reading from a carbon dioxide sensor to identify an occupancy level of the environment, and to store one or more historical occupancy levels;
   adjusting the damper to a first damper position that is dependent, at least in part, on the reading of the carbon dioxide sensor; and
   adjusting the damper to a second damper position upon determining an erroneous reading from the carbon dioxide sensor, wherein the second damper position is different from the first damper position, and is dependent on one or more of the historical occupancy levels.

20. The method of claim 19, wherein the second damper position represents a damper position that is less than fully opened.

21. The method of claim 19, wherein the carbon dioxide sensor provides a reading that, when operating properly, is proportional to a carbon dioxide concentration in the environment.

22. The method of claim 21, wherein the erroneous reading is determined by detecting a reading that is below a minimum threshold value.

23. The method of claim 21, wherein the erroneous reading is determined by detecting a reading that is above a maximum threshold value.

24. The method of claim 22, wherein the minimum threshold value is dependent upon a time of a day and/or a day of a week.

25. A controller configured to control ventilation of an environment, the controller configured to:
monitor an indication of occupancy over time and storing one or more historical occupancy levels;
modify a relative amount of fresh air provided to the environment in response to the indication of occupancy;
determine if the indication of occupancy is erroneous; and
provide an amount of fresh air to the environment if the indication of occupancy is determined to be erroneous, wherein the amount of fresh air is dependent on the one or more historical occupancy levels.

26. The controller of claim 25, wherein the controller monitors the indication of occupancy at least in part via a carbon dioxide sensor.

27. The controller of claim 25, wherein the controller monitors the indication of occupancy at least in part via a motion sensor.

28. The controller of claim 25, wherein the controller is configured to modify a relative amount of fresh air provided to the environment by at least partially opening or at least partially closing a damper.

29. The controller of claim 28 wherein the controller is configured to provide the amount of fresh air to the environment if the indication of occupancy is determined to be erroneous by partially opening the damper to a position determined as a function of maximum environment occupancy.

30. The controller of claim 25, wherein the amount of fresh air is dependent, at least in part, on the indication of occupancy just before the indication of occupancy was determined to be erroneous.

31. The controller of claim 25, wherein the controller monitors the indication of occupancy at least in part by monitoring a voltage that is proportional to an occupancy level.

32. The method of claim 1, wherein the message instructs a user to arrange for a service call.

33. The method of claim 1, wherein the occupancy indicator is deemed to be providing an output that is erroneous when the output is outside of a valid range, wherein the valid range is dependent upon a time of a day and/or a day of a week.

34. The method of claim 1, wherein the occupancy indicator is deemed to be providing an output that is erroneous when the output is outside of a valid range, wherein the valid range is a learned range that is learned by a controller over time.

35. A method of controlling ventilation of an environment, the method comprising the steps of:
monitoring an output of an occupancy indicator of the environment;
providing a first amount of fresh air to the environment if the occupancy indicator is deemed to be providing an output that is erroneous, the output being erroneous if outside of a valid range, wherein the valid range is dependent upon a time of a day and/or a day of a week; and
providing a second amount of fresh air to the environment if the occupancy indicator is deemed to be providing an output that is valid, the output being valid if inside of the valid range, wherein the second amount of fresh air is different from the first amount of fresh air and is dependent, at least in part, on the valid output of the occupancy indicator.

36. A method of controlling ventilation of an environment, the method comprising the steps of:
monitoring an output of an occupancy indicator of the environment;
providing a first amount of fresh air to the environment if the occupancy indicator is deemed to be providing an output that is erroneous, the output being erroneous if outside of a valid range;
providing a second amount of fresh air to the environment if the occupancy indicator is deemed to be providing an output that is valid, the output being valid if inside of the valid range, wherein the second amount of fresh air is different from the first amount of fresh air and is dependent, at least in part, on the valid output of the occupancy indicator; and
wherein the first amount of fresh air is dependent, at least in part, on the valid output of the occupancy indicator just before the occupancy indicator was deemed to be providing an output that is erroneous.

* * * * *